United States Patent [19]

Simonette

[11] Patent Number: 5,641,119
[45] Date of Patent: Jun. 24, 1997

[54] THERMAL RELIEF VALVE

[75] Inventor: Dallas Simonette, Andover, Minn.

[73] Assignee: GP Companies, Inc., Mendota Heights, Minn.

[21] Appl. No.: 459,317

[22] Filed: Jun. 2, 1995

[51] Int. Cl.⁶ .............................................. G09D 23/12
[52] U.S. Cl. ........................ 236/92 C; 236/93 A; 236/100
[58] Field of Search ............................ 236/92 C, 93 A, 236/99 J, 100, 34, 99 K

[56] References Cited

U.S. PATENT DOCUMENTS

| | | | |
|---|---|---|---|
| 3,167,249 | 1/1965 | Moosmayer et al. | 236/34 |
| 3,182,911 | 5/1965 | Drapeau | 236/34 |
| 3,194,009 | 7/1965 | Baker | 236/100 |
| 3,302,391 | 2/1967 | Mihm | 236/100 |
| 3,498,537 | 3/1970 | Wong | 236/34 |
| 3,591,078 | 7/1971 | Feinberg | 236/100 |
| 3,659,783 | 6/1972 | Schwartz | 236/93 A |
| 4,285,467 | 8/1981 | Maltby | 236/100 |

*Primary Examiner*—William E. Tapoical
*Attorney, Agent, or Firm*—Craig J. Lervick; Jennifer K. Farrar; Janal M. Kalis

[57] ABSTRACT

The present invention relates to a thermal relief valve that includes a main body with an inner annular surface that includes a shoulder proximal to one end of the main body. The relief valve also includes a spring that rests on the shoulder of the inner annular surface of the main body. The relief valve additionally includes a thermal actuator component with a cup section and a piston section attached to the cup section. The cup section is separated from the piston section by a shoulder. The shoulder rests upon the spring. The relief valve also includes an O-ring that rests upon the shoulder of the thermal actuator and a cap that rests upon an O-ring within the main body of the relief valve.

12 Claims, 2 Drawing Sheets

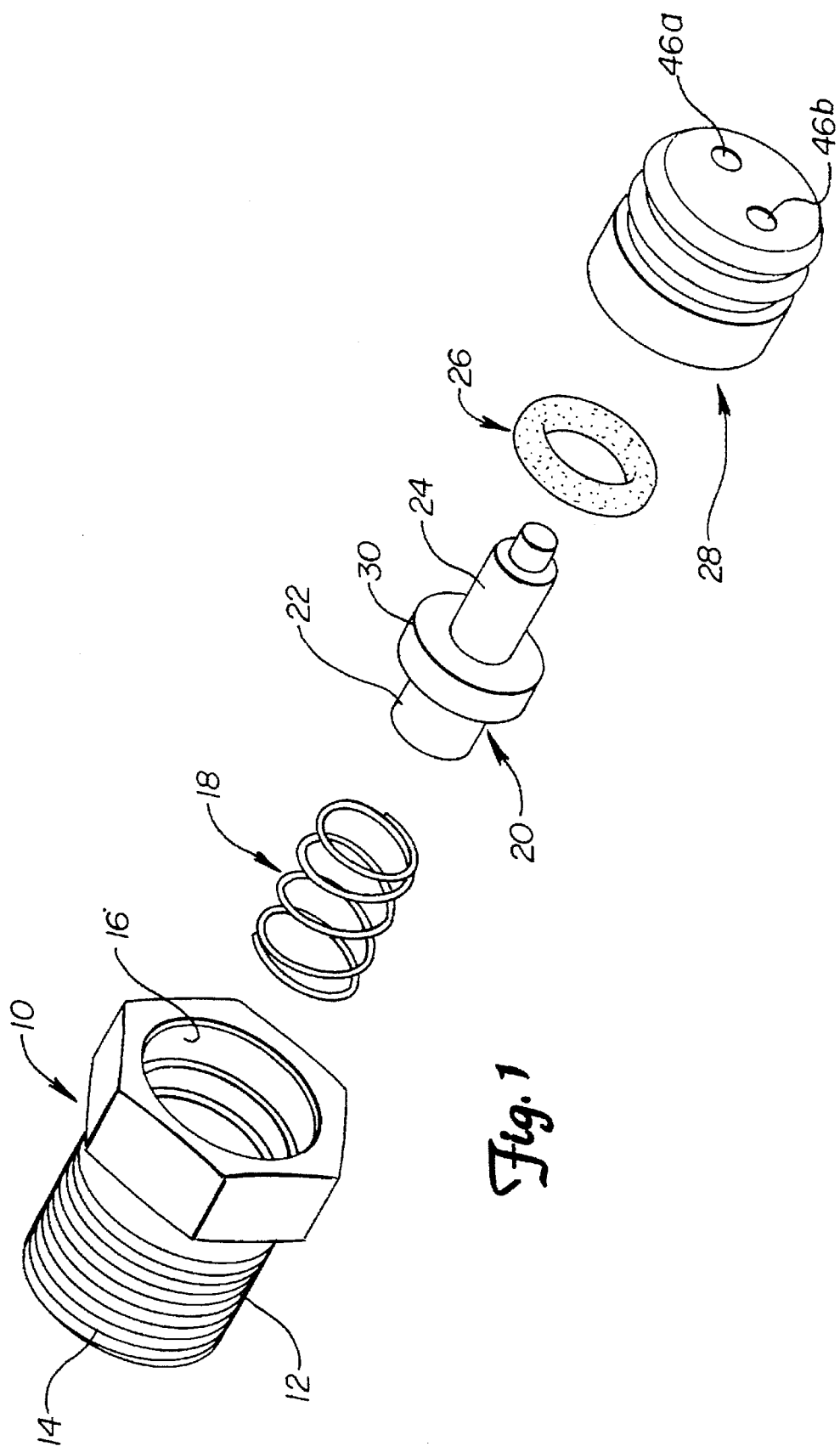

THERMAL RELIEF VALVE

BACKGROUND OF THE INVENTION

The present invention relates to a thermal relief valve and to a method for making the thermal relief valve.

Relief valves are part of virtually all piping arrangements that contain liquid having a differential of either pressure or temperature. Typically, pressure relief is required in a piping arrangement that includes a positive displacement pump, such as a rotary pump or a reciprocating pump, in order to reduce overpressurization at the pump and of the system. Thermal relief may also be required in a piping arrangement that conveys a liquid that is susceptible to transient temperature excursions.

One type of system vulnerable to a transient temperature excursion is a piping arrangement system that recirculates water or other liquid with a pump. If the volume of liquid recirculated is low, and the liquid is circulated at a high rate, it is possible for the liquid temperature within the piping arrangement to increase while the liquid is recirculated due to the heat generated by the pumping action.

To prevent the temperature of the liquid from exceeding a temperature that would cause damage to components in the system, the piping arrangement is typically provided with a type of a thermal relief valve. The thermal relief valve reduces temperature and permits make-up of cooler liquid under pressure into the piping arrangement system.

Usual operation against a closed discharge of the pump is both infrequent and of a very short duration. To modulate damaging consequences of this operation, an automatic unloader valve with an external return connection is preferably used. Liquid redirected by the unloader valve is typically piped back to the source of supply.

Types of thermal relief valves include a "squeeze-push valve" and a "diaphragm valve." The squeeze-push valve includes a synthetic rubber bag that surrounds a stainless steel piston. The synthetic rubber bag is enclosed within a main body having a cup and a cap over the cup. The stainless steel piston protrudes from the cap. Within the cup is a wax. The wax melts at a predictable predetermined temperature. When the valve is heated, the wax melts, pressurizing the cup and the cap. As a consequence, the rubber bag collapses and forces the piston out of the cap by both a lateral squeeze and a vertical push.

The diaphragm valve is one where a synthetic rubber diaphragm separates the wax within the cup from a piston within a piston guide. The piston guide is tapered with respect to diameter. Above the rubber diaphragm, within the piston guide, is an oversized plug. An increase in temperature causes the wax to expand, applying pressure to the rubber plug. The rubber plug is then forced into a reduced diameter in the tapered piston guide.

The cup of a thermal relief valve is typically hollow and encloses a wax. The wax melts at a predictable predetermined temperature. When the cup is heated, the wax within the cup melts and expands. The melted wax pushes against the piston, moving the piston. Movement of the piston forces the body to unseat from the o-ring. Once the piston is moved, hot liquid is vented from the system. The venting continues until the liquid is cooled due to a concurrent cool liquid make-up to the system.

SUMMARY OF THE INVENTION

The present invention includes a thermal relief valve with a housing having a generally cylindrical shape and a first and a second end. The housing has an outer annular surface and an inner annular surface opposing the outer annular surface. The inner annular surface includes a shoulder proximal to one of the ends of the housing. The relief valve also includes a spring that rests on the shoulder of the inner annular surface of the housing. The relief valve additionally includes a thermal actuator component that includes a cup section and a piston section. Each of the cup section and the piston sections are attached to a shoulder component of the thermal actuator. The shoulder rests upon the spring. The relief valve further includes an O-ring that seats upon the shoulder of the thermal actuator and a cap that supports the O-ring within the housing of the relief valve.

DESCRIPTION OF THE DRAWINGS

FIG. 1 is an exploded view of one embodiment of the thermal relief valve of the present invention.

DETAILED DESCRIPTION OF THE PREFERRED EMBODIMENTS

Figure 2A:
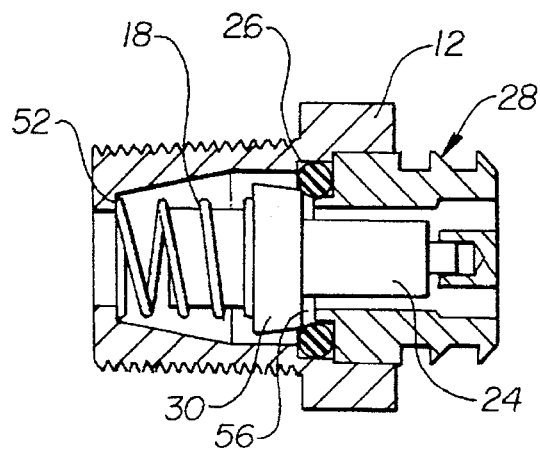
FIG. 2a is a cutaway view of one embodiment of the assembly of the thermal relief valve of the present invention in a closed position.

The thermal relief valve of the present invention, illustrated generally at 10 in FIG. 1, includes a housing 12 with an inlet 14 and an outlet 16, a spring 18 positionable within the housing 12, a thermal actuator component 20 with a cup section 22 and a piston section 24 positionable on the spring 18, an O-ring 26 positionable on the thermal actuator 20 substantially between the cup 22 and the piston 24 and a cap 28 positionable over the piston section 24 of the thermal actuator 20. The O-ring 26 is positioned on the thermal actuator 20 so as to seat on a cylindrical shoulder 30 of the thermal actuator component 20.

The thermal relief valve 10 of the present invention includes components with features that permit a miniaturization of the relief valve 10. In conventional piping systems, the thermal relief valve tends to be of a standard size. Typically, thermal actuator diameters range from about 0.433 inches to 1.980 inches. Housing lengths are about 3 inches. In many instances, an oversized thermal relief valve must be employed in a relatively low volume piping system because a small relief valve of suitable size cannot be found. As a consequence, the oversized relief valve overshoots and undershoots its temperature set point and causes disruption in the performance of any pump in the conventional piping system.

When employing standard sized relief valves, a low volume system must generate enough heat in order to heat a relief valve housing that is out-of-proportion with the size of the piping system. The extra heat evolution required results in the conventional piping system having an unstable temperature and pressure.

In addition to the relief valve housing, the conventional piping system must heat wax in an oversized thermal actuator cup. Because of the extra heat required to increase the temperature of relief valve components such as the housing, the temperature of water or other liquid within the piping system must be substantially greater than is desired in order to actuate the relief valve. With the device 10 of the present invention, however, a small or miniature thermal relief valve can be provided for virtually any application.

It has been found that the miniaturized thermal relief valve 10 of the present invention can be actuated by a piping system liquid temperature of about 145° F. when the wax within the thermal actuator cup 22 has a melting point of about 145° F. This is a dramatic improvement as compared to a standard size relief valve which requires a system temperature of about 165° F. to actuate the larger thermal relief valve with a wax that melts at 145 degrees F.

The smaller size of the relief valve 10 of the present invention permits the cup component 22 of the thermal actuator 20 to be positioned in the liquid stream. The thermal relief valve 10 can respond very rapidly to any excursion in temperature in the piping system. This thermal actuator 20 positioning is a great improvement over conventional thermal relief valves which have a diameter and length that are too large for positioning in the liquid stream of a small or miniature piping system.

The housing 12 of the relief valve 10 has a length, in one preferred embodiment, of about 1.75 inches. This length is substantially less than the length of a standard thermal relief valve of about 3 inches. Because of the shorter length, the cup 22 of the thermal actuator 20 is positionable within a liquid stream of a small diameter piping system.

As shown in FIG. 1, the housing 12 is preferably threaded. The threads are of a size and configuration that permit use of the thermal relief valve 10 with any conventional piping system. Thus, the thermal relief valve 10 of the present invention may be used on virtually any type of piping system.

Figure 2B:
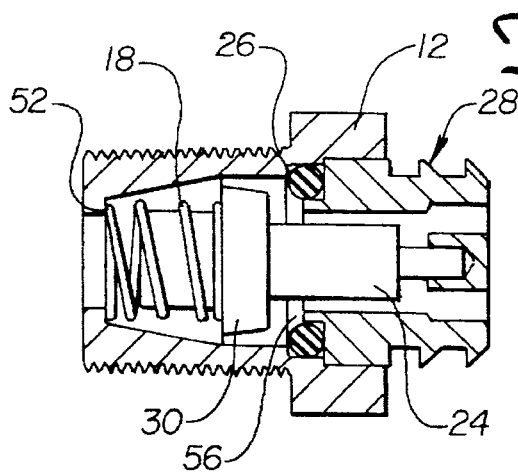
FIG. 2b is a cutaway view of one embodiment of the assembly of the thermal relief valve of the present invention in an open position.
Figure 3A:
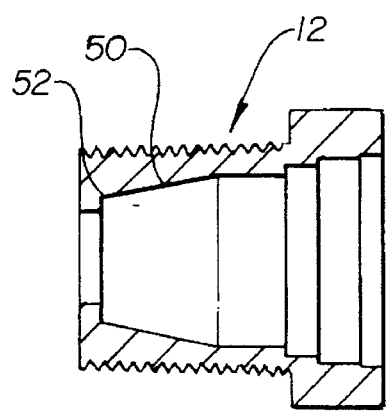
FIG. 3a is a side view of one embodiment of the valve housing of the present invention.
Figure 3B:
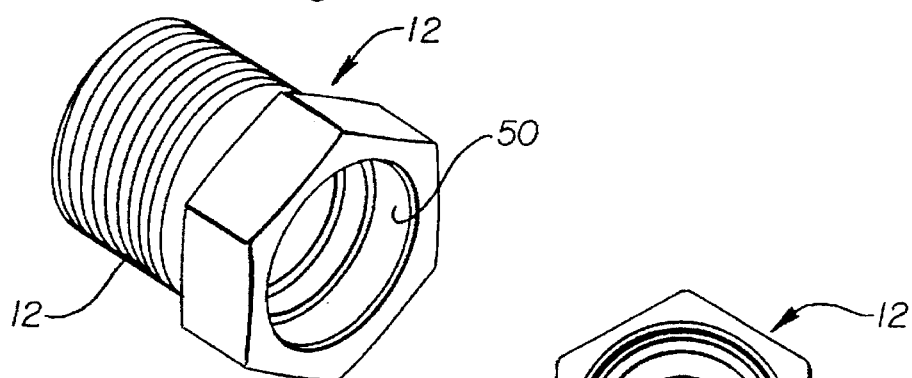
FIG. 3b is a perspective view of one embodiment of the valve housing of the present invention.
Figure 3C:
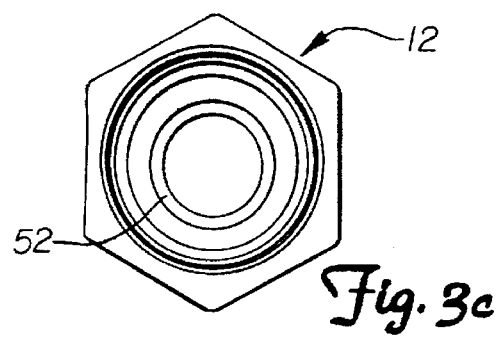
FIG. 3c is a cross-sectional view of one embodiment of the valve housing of the present invention.

The housing 12 includes an inner annular surface 50 with a first shoulder 52, as shown in FIGS. 2a and 2b. The first shoulder 52 supports the spring 18 as shown in FIGS. 2a and 2b. In one preferred embodiment, the spring 18 is made of stainless steel. The spring 18 has a wire diameter of about 0.026 inches and a length of about one-half inches. The spring preferably has a torsion of about 0.360 ⊖.

The cap 28 is preferably a piece that is separate from the housing 12. As shown in FIG. 1, the cap 28 includes two vent holes 46a and 46b, for venting liquid released when the piston 24 is lifted from its seat by a pressure differential across the thermal actuator 20. Although two vent holes are shown, it is contemplated that the cap 28 may include as few as one hole or more than two holes. In one embodiment, the cap 28 includes hose barbs for retaining hose, through which is routed a relief flow of liquid to a drain.

The thermal actuator 20, when heated, has a stroke of about 0.100 to 0.130 inches. Thus, even though the overall size of the thermal relief valve piston 24 is miniaturized, the stroke length allows for an actuation of a magnitude within a range of a full sized valve.

The piston section 24 of the thermal actuator component 20 may be integral with the thermal actuator component, in one embodiment. The piston component 24 may also be a separate component, insertable in the thermal actuator component 20. In this embodiment, the thermal actuator component 20 encloses a channel for positioning the piston section 24. One advantage of this second embodiment is that the piston component 24 may be separately manufactured in accordance with requirements of a particular piping system. The piston 24 may then be of a length, diameter and material most suitable for a particular piping system.

Unlike conventional thermal relief valves, the O-ring 26 rests upon the shoulder 30 of the thermal actuator 20 of the thermal relief valve 10 of the present invention when in a non-venting or closed position. In one embodiment, the O-ring has an outer diameter of ½ inch. In a conventional thermal relief valve, an O-ring such as 26 rests upon the housing 16.

The O-ring 26 seats the cap 28, as shown in FIGS. 2a and 2b. Thus, in the thermal relief valve 10 of the present invention, the O-ring 26 rests upon the thermal actuator 20 and seats the cap 28.

In order for this arrangement to occur, there must be a particular proportional relationship between the maximum diameter of the cap 28 and the maximum diameter of the thermal actuator 20. In particular, the thermal actuator 20 includes the shoulder 30 having a diameter that supports the O-ring 26. In one embodiment, the diameter of the shoulder 30 is about ½ inch. The diameter of the cap 28 is substantially the same as the diameter of the O-ring 26 and the diameter of the shoulder 30. This relationship permits a flow of water past the thermal actuator into the cup and through the cap 28 because of a clearance such as is shown in FIGS. 2a and 2b at 56. This relationship also permits miniaturization of the relief valve 10 of the present invention.

Although the present invention has been described with reference to preferred embodiments, workers skilled in the art will recognize that changes may be made in form and detail without departing from the spirit and scope of the invention.

What is claimed is:

1. A relief valve comprising:
   a housing having a generally cylindrical shape wherein the housing has an outer annular surface and an inner annular surface opposing the outer annular surface wherein the inner annular surface includes a first shoulder proximal to one end of the housing and a second shoulder;
   a spring that rests on the first shoulder of the inner annular surface of the housing;
   a thermal actuator component that includes a cup section and a piston section wherein the cup section is separated from the piston section by a shoulder section of the thermal actuator and wherein one side of the shoulder section rests upon the spring;
   an O-ring that contacts the opposite side of the shoulder section of the thermal actuator when the actuator is in a first position and that rests upon the second shoulder of the housing when the thermal actuator is in a second position wherein a portion of the O-ring is exposed for contacting the shoulder of the thermal actuator and forming a seal when the thermal actuator is in a closed position; and
   a cap wherein the O-ring is seated by the cap.

2. The relief valve of claim 1 wherein the cap is perforated for liquid release.

3. The relief valve of claim 1 wherein the housing is threaded at the outer annular surface.

4. The relief valve of claim 1 wherein the piston section of the thermal actuator includes a piston housing with a channel and a piston insertable in the piston housing.

5. The relief valve of claim 1 wherein the housing length does not exceed one and one-half inches.

6. The relief valve of claim 1 wherein the spring is under compression.

7. A relief valve comprising:
   a housing having a first end, a second end and a generally cylindrical shape wherein the housing has an outer annular surface and an inner annular surface opposing the outer annular surface, wherein the inner annular surface includes a first shoulder proximal to the first end of the housing and a second shoulder spaced apart from the first shoulder;

a spring that rests on the first shoulder of the inner annular surface of the housing;

a thermal actuator component that includes a cup section and a piston section wherein the cup section is separated from the piston section by a shoulder section of the thermal actuator and wherein the shoulder rests upon the spring;

an O-Ring that rests upon the second shoulder of the inner annular surface; and a vent cap secured to the second end of the housing, having an annular seating surface and at least one vent hold, wherein the O-Ring contacts the annular seating surface, the second shoulder of the housing and a portion of the inner annular surface forming a liquid seal between the housing and vent cap, wherein the O-Ring contacts the shoulder section of the thermal actuator and creates a seal therebetween when the thermal actuator is in a first closed position, and is out of contact with the thermal actuator when in a second open position.

8. The relief valve of claim 7 wherein the vent cap further includes a lip projecting axially from the annular seating surface which contacts an inner surface of the O-Ring.

9. The relief valve of claim 7 wherein the second shoulder of the housing and the annular seating surfaces are oriented normal to a central longitudinal axis of the house.

10. The relief valve of claim 8 wherein the lip surface is cylindrical and spaced apart from the portion of the inner annular surface disposed between the second shoulder of the housing and the annular seating surface of the vent cap.

11. The relief valve of claim 7 wherein the vent cap is secured to the housing by means of an interference fit.

12. The relief valve of claim 7 wherein the vent cap is secured to the housing by means of a threaded connection.

* * * * *

UNITED STATES PATENT AND TRADEMARK OFFICE
CERTIFICATE OF CORRECTION

PATENT NO. : 5,641,119
DATED : June 24, 1997
INVENTOR(S) : Dallas W. Simonette

It is certified that error appears in the above-indentified patent and that said Letters Patent is hereby corrected as shown below:

Column 4, line 53, delete "car" and insert --cap--.

Signed and Sealed this

Twenty-fifth Day of November, 1997

Attest:

BRUCE LEHMAN

Attesting Officer

Commissioner of Patents and Trademarks